Oct. 28, 1958  E. Z. GABRIEL  2,857,673
COMPUTER FOR SOLUTION OF UNKNOWN SIDES OR ANGLES OF
A TRIANGLE OR OF TRIANGLES
Filed Dec. 16, 1953  4 Sheets-Sheet 1
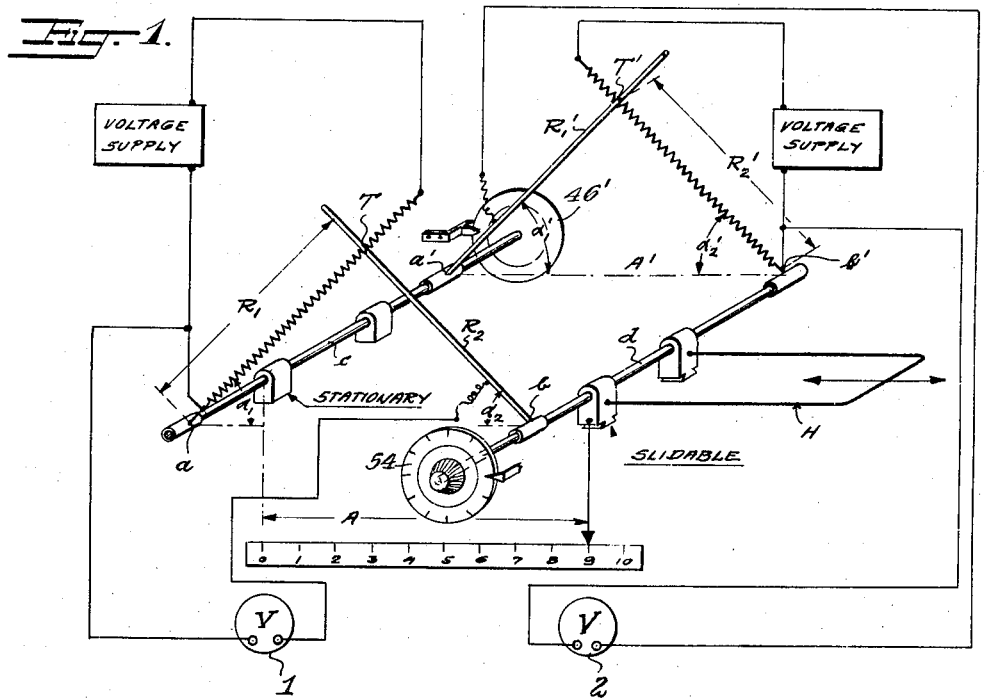
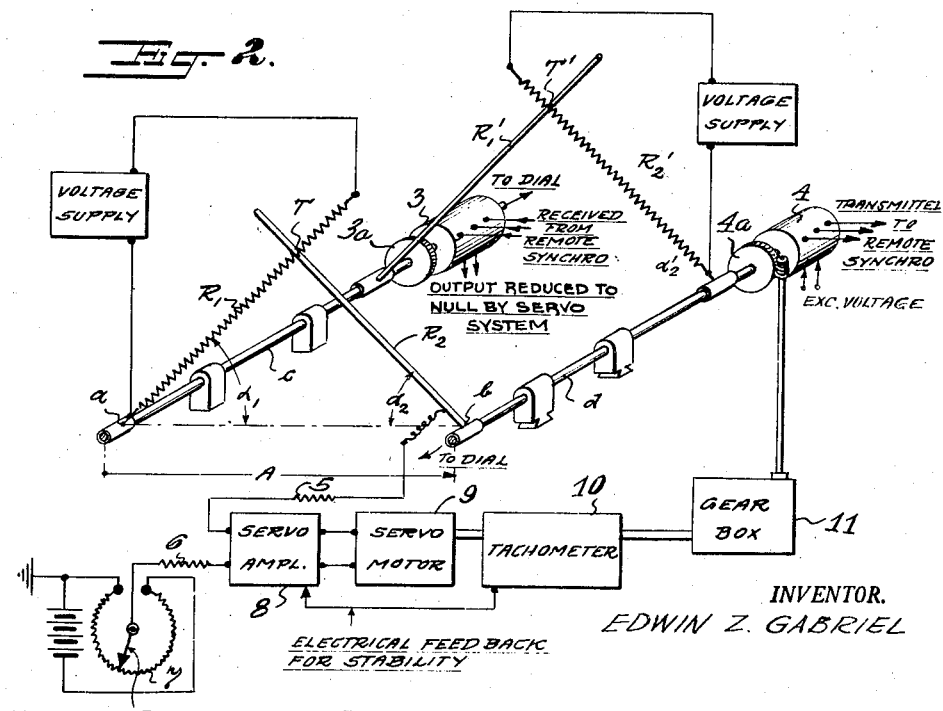
INVENTOR.
EDWIN Z. GABRIEL Oct. 28, 1958 E. Z. GABRIEL 2,857,673
COMPUTER FOR SOLUTION OF UNKNOWN SIDES OR ANGLES OF
A TRIANGLE OR OF TRIANGLES
Filed Dec. 16, 1953 4 Sheets-Sheet 2

INVENTOR.
EDWIN Z. GABRIEL

Oct. 28, 1958 E. Z. GABRIEL 2,857,673
COMPUTER FOR SOLUTION OF UNKNOWN SIDES OR ANGLES OF
A TRIANGLE OR OF TRIANGLES
Filed Dec. 16, 1953 4 Sheets-Sheet 3
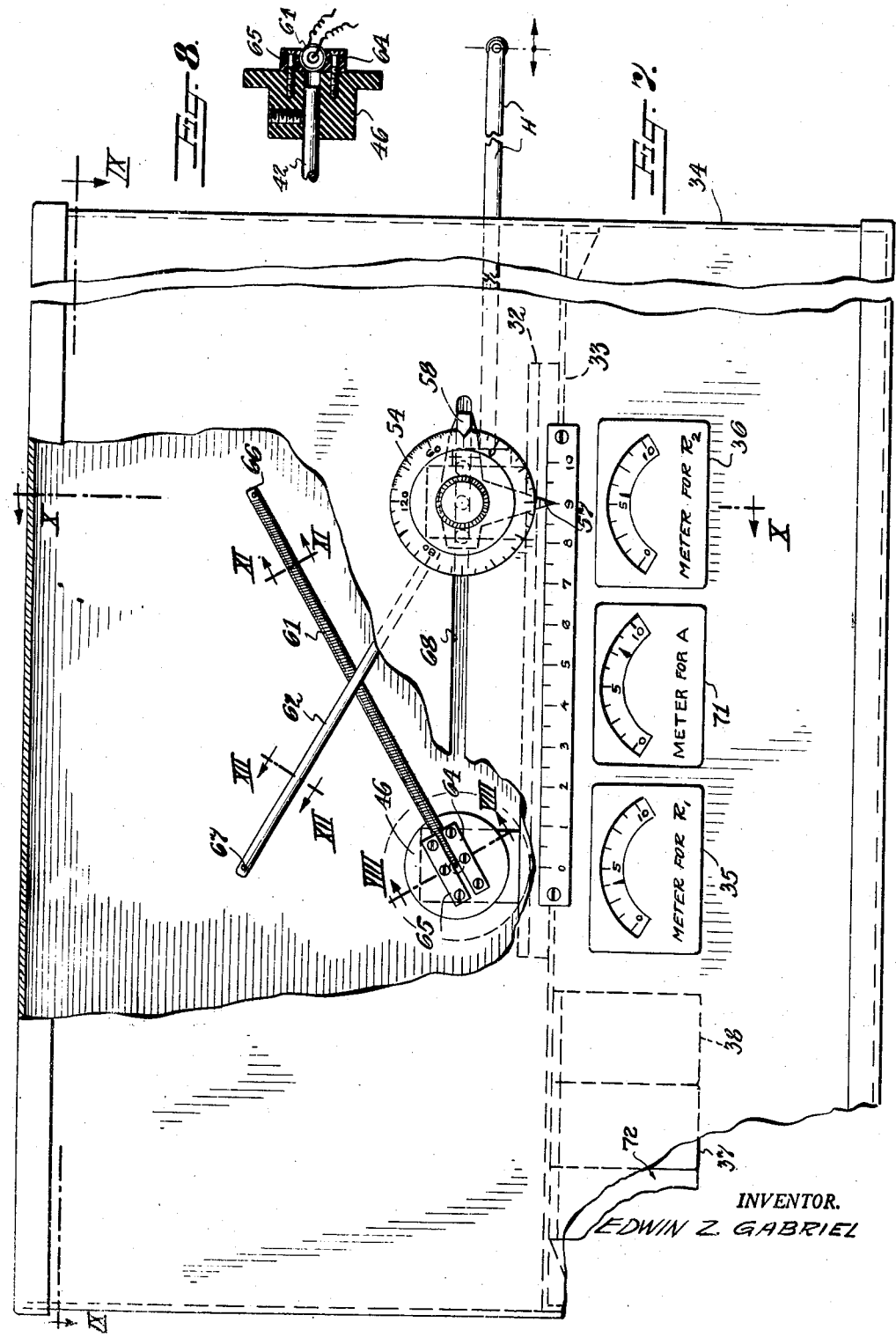
INVENTOR.
EDWIN Z. GABRIEL Oct. 28, 1958
E. Z. GABRIEL
2,857,673
COMPUTER FOR SOLUTION OF UNKNOWN SIDES OR ANGLES OF
A TRIANGLE OR OF TRIANGLES
Filed Dec. 16, 1953
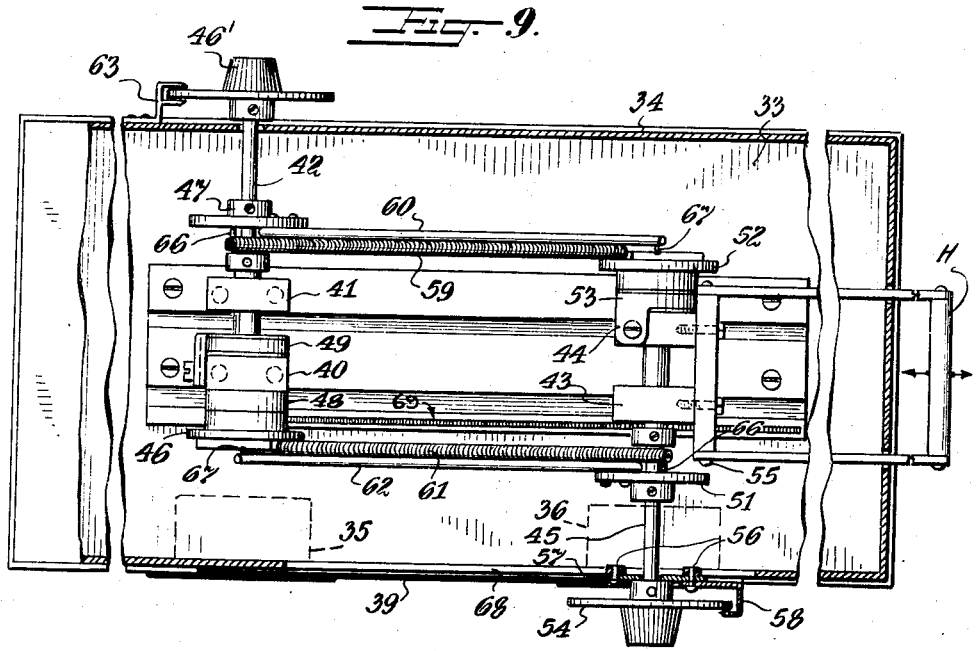
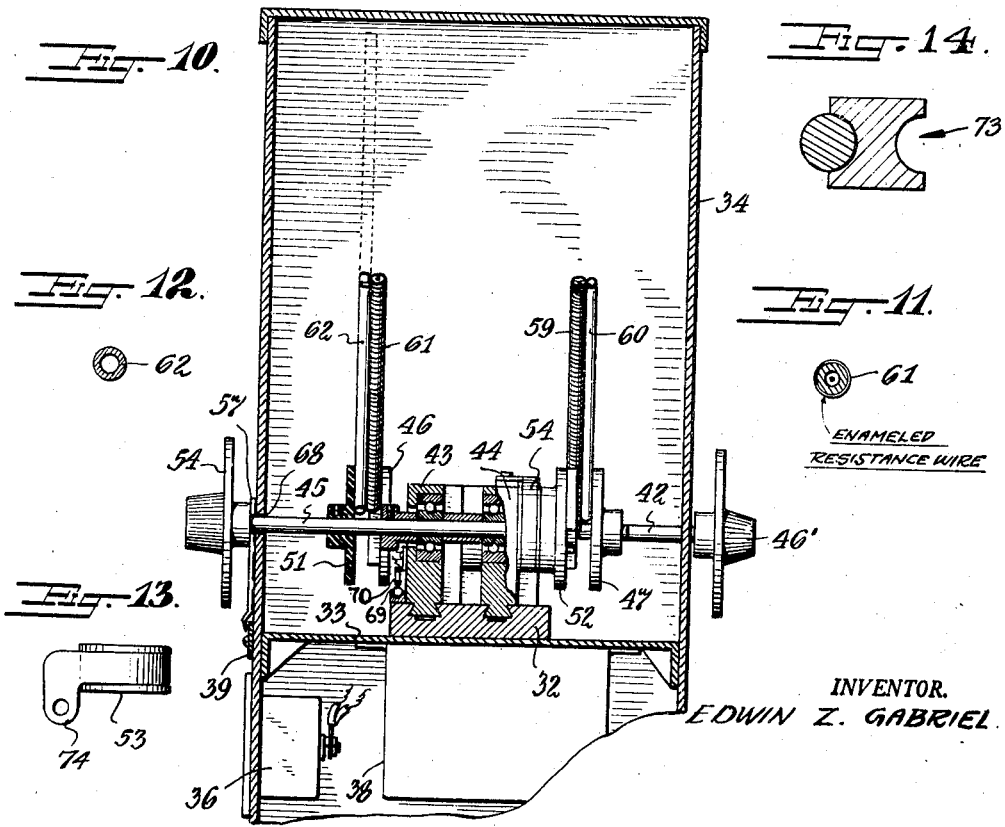
INVENTOR.
EDWIN Z. GABRIEL

United States Patent Office 2,857,673
Patented Oct. 28, 1958

2,857,673

COMPUTER FOR SOLUTION OF UNKNOWN SIDES OR ANGLES OF A TRIANGLE OR OF TRIANGLES

Edwin Z. Gabriel, Montclair, N. J.

Application December 16, 1953, Serial No. 398,564

8 Claims. (Cl. 33—1)

The present invention relates to either an automatic or a manual type computer, and it relates more particularly to an electro-mechanical computer adapted to solving either oblique angle or right triangles.

It is often necessary to solve triangles in an electrical manner, whereby data may be applied to a computer circuit and a solution may be obtained as a voltage.

Various military and non-military applications of such a computer are listed below.

Non-military applications (1) Solution of structural problems: (a) Location of bolts on a gusset plate. (b) Solution of problems in carpentry wherein bolts or nails must be placed in a triangular configuration.

(2) Solution of navigational problems involving triangular configurations.

(3) Solution of surveying problems where a high degree of accuracy is unnecessary because of the limited accuracy of the data available.

(4) Location of a ship in distress by means of ground located direction finding equipment.

(5) Location of any signal-emitting device on land or sea by the use of direction finding equipment sensitive to either sound waves or radio waves.

(6) Location of a commercial aircraft in flight and guidance of that aircraft to the airfield from the airfield control tower by means of ground radar and this triangular computer.

(7) As an aid in measuring the speed of vehicles, aircraft and sea craft.

Miliary applications (1) Location of a ground target with the aid of sound direction finding equipment.

(2) Location of an enemy ship by means of equipment sensitive to either radio waves or sound waves.

(3) Location of an enemy target, on land, sea, or in the air, by means of ground, airborne, or underwater radar equipment and the triangular computer described herein.

Certain problems involving the location of a ground target employ radio locating apparatus where the position of the target relative to the counterbattery may be shown on a plan position indicating oscilloscope. In general, the target to be fired upon appears as a bright spot of light on the oscilloscope screen at a certain distance from a point on the oscilloscope screen which represents the position of the counterbattery. Here, basically, the problem is to solve for one unknown side of a triangle having been given one side (which may be the distance between two directions finding—D. F.—stations) and the adjacent angles. This information may be of an electrical character and may be in the form of voltages, either A. C. or D. C. If the target range is changing, this rate may also be measured.

It is, therefore, an object of the present invention to provide an automatic computer which gives a voltage proportional to the ground range of the target from one D. F. station at, say, $a$.

It is still another object of the present invention to have the same computer give a voltage proportional to the ground range of the target from the other D. F. station at, say, $b$.

The invention, however, will be more fully understood from the following detailed description with the aid of the accompanying drawings and figures; wherein Fig. 1 illustrates the geometry of the problem and shows the two main portions of the computer for solving triangles having straight sides. Figs. 2 and 3 give the circuits and block diagrams of the components for automatic operation of the computer. Fig. 4 is a diagram of a computer for solving spherical triangles. Fig. 5 shows the electrical circuit for a typical vertical resistance member. Fig. 6 shows the electrical circuit for the horizontal resistance member of the spherical triangle. Figs. 7 to 13, inclusive, are mechanical drawings of the computer shown in Fig. 1.

Referring to the front half of Fig. 1, distance A, for military applications, is usually a known length and usually has a fixed value. $R_1$ may represent the range of the target from station "$a$." $R_2$ may represent the range of the target from station "$b$." Station "$a$" may represent the location of a direction finding station whose angular measurement may be $\alpha_1$ (the angle $R_1$ makes with base A). Station "$b$" may represent the location of a second direction finding station whose angular measurement or reading may be $\alpha_2$ (the angle $R_2$ makes with base A). Point T represents the position of the target. It is apparent from the figure that the triangle there shown is not a right triangle except as a special case.

The rear half of Fig. 1 is the same as the front half, except that in the latter $R_1$ represents a high resistance element while in the former $R_2$ represents the high resistance element. In either figure base A may also represent a high resistance element if it is desired to have this distance presented in the form of voltages.

Fig. 2, including references to Fig. 1, is a schematic circuit diagram of one embodiment of the present invention. To begin with, the method employed by the computer is one of physical representation of the actual problem. Consequently, the lines of Fig. 1 represent both physical beams and high resistance material such as wire wound resistances. Base A consists of a flat or round beam at each end of which is located a pivoted member. This pivoted member is a beam which may swing about the pivot a range from 0° up to 330°. Its swing may be limited to any intermediate angle such as 180°. The beam (represented by distance $R_1$ on Fig. 1) contains a high resistance element. Then $R_2$ is a beam containing material of very low resistance which is in contact with $R_1$ at a point T. Both beams are circular in cross section.

Now a voltage is applied across the entire beam containing the high resistance element to represent the maximum distance or range. To explain the function of this high resistance, assume that both distances $R_1$ and A as well as angle $\alpha_1$ are known and that angle $\alpha_2$ is required. Beam $R_1$ is roated until its position makes an angle $\alpha_1$ with beam A. Then beam $R_2$ is rotated while continually making contact with beam $R_1$ until it assumes a position at which meter 1 (shown on Fig. 1) gives a reading corresponding to the known value of $R_1$. At this point the angular position of $\alpha_2$ may be read either on a dial or on another meter graduated to give the direction of $R_2$ in the units desired.

Again referring to Fig. 2, a shaft $c$ containing beam $R_1$ rigidly mounted to it at "$a$" is perpendicular to and in the horizontal plane of base A. This shaft contains another pivoted beam $R_1'$ at "$a'$" which moves coincidentally with $R_1$ so that both beams make the identical angle with base A whenever either one is caused to rotate. Similarly, both beams $R_2$ and $R_2'$ are attached to shaft $d$ at points $b$ and $b'$ respectively. As shaft $d$ is rotated both beams continually make identical angles with base A. While $R_1$ previously was specified as having a high resistance element, now beam $R_1'$ is specified as having a material of low resistance which is continually in contact with beam $R_2'$. Similarly, now $R_2'$ is the beam containing the high resistance element. $R_2$ is insulated from shaft $d$. $R_1'$ is insulated from shaft $c$.

This ganging of beams $R_1'$ with $R_1$ and $R_2'$ with $R_2$ is done in order to obtain an electrical reading to correspond to the distance $R_2'$. The magnitude $R_2$ is read on meter 2. Since both triangles $ab$T and $a'b'$T' are identical, distance $R_2'$ is equal to $R_2$. Thus, when distances $R_1$ and A as well as angle $\alpha_1$ are known, the values of both angle $\alpha_2$ and distance $R_2$ may be obtained simultaneously. Similarly, when distances $R_2$ and A as well as angle $\alpha_2$ are known, the values of both angle $\alpha_1$ and distance $R_1$ may be obtained simultaneously. It is obvious that voltage supplies across $R_1$ and $R_2'$ may be reduced to a single voltage supply applied across both resistive elements in parallel having a minimum current capacity equal to the applied voltage divided by the equivalent resistance of the resistive elements.

Thus far, it has been assumed that input information is introduced into the shafts manually. However, one method of feeding the shaft information into the computer automatically is now described. Referring to Fig. 2 it is still desired to set distance A manually, through this information also may be introduced to the computer automatically. To apply this geometric computer to an actual problem let this distance A represent the horizontal displacement between a radar set and the control tower of an airport. It is required to obtain the distance between the control tower and an incoming aircraft. The radar set will give both angle $\alpha_1$ (the angle between the flight vector of the aircraft and the base A) and the slant range of the aircraft, $R_1$, which could be converted to ground range if desired, as the ground range is approximately equal to the slant range when the aircraft is sufficiently distant from the airfield. Now the azimuth angle $\alpha_1$ is to be positioned first. This is done by gearing the appropriate radar shaft to azimuth shaft $c$ of the computer. The method shown on Fig. 2 is to have this shaft positioning done remotely by means of a synchro transmission system in which positioning of a second synchro shaft causes the first synchro 3 shaft to rotate to the same angular position. This shaft positioning by a radar set may be either an intermittent or a continuous positioning of the shaft $c$ with the approach of the aircraft toward the airfield.

If the shaft positioning is intermittent, then a second or two time delay may be needed to permit arm $R_1$ to reach a position of stability or equilibrium by the remote control system. Range information from the radar set causes the arm of a reference voltage potentiometer 7 to be set. The voltage output at the potentiometer arm's position must be matched by the voltage across the beam distance $a$T of the computer. Consequently, both voltage sources, opposite in sense to each other, are introduced into a summing servo amplifier 8 through resistors 5 and 6. The output of this amplifier drives one phase of a two phase servo motor 9. This motor is mechanically linked through a gear box 11 to shaft $d$ of the computer. Rotation of shaft $d$ will cause voltage across $R_1$ to vary until it is equal and opposite in sense to the voltage supplied by the reference source. When the two voltages agree, the motor will receive insufficient voltage from phase one (of the servo motor) causing it to cease rotating; and beam $R_2$ will then be correctly positioned, and the distance from the control tower to the approaching aircraft may be obtained from the reading on meter 2. Simultaneously, angle $\alpha_2$, the angle between $R_2$ and base A, is available, and may be transmitted elsewhere by means of synchro 4. Element 10 in Fig. 2 of drawing is a tachometer generator and its output voltage introduces velocity damping to the system. Element 19 of Fig. 3 also is a tachometer generator and its output voltage introduces velocity damping to the servo system by being fed negatively back into the input stage of the servo amplifier. Thus a stable remote positioning system is achieved.

Fig. 3 shows a schematic circuit diagram of another embodiment of the present invention in which, when one side A and the adjacent angles, $\alpha_1$ and $\alpha_2$, are known and the known angular information is introduced into the computer automatically, then the other two sides may be obtained and automatically indicated on meters. Again known distance A is set manually by moving handle H. Now angle $\alpha_1$ is to be positioned first. This is done by introducing angular information to synchro 12 from a remote source of information. Next angle $\alpha_2$ is to be positioned. This is done by remotely introducing angular information into synchro 13. As synchro 13 positions shaft $d$ and beams $R_2$ and $R_2'$ simultaneously, the voltage introduced from $R_1$ into the servo amplifier 17 is varying. As this voltage is different from that received from a calibrated potentiometer 16, the difference in voltages, designated as an error voltage, is amplified. The resulting voltage causes the servo motor 18 to rotate the arm of the potentiometer 16 through a reduction gear box 20 until the error voltage is reduced to a predetermined value. This predetermined value is based on the accuracy capabilities of the computer. The voltage from potentiometer 16 is introduced into the servo amplifier 15 through summing resistance 14. When beam $R_2$ has been finally positioned by synchro 13, then the voltage introduced through resistance 14 becomes constant and the potentiometer arm then reaches a position of stability. Then the pointer on the potentiometer will indicate a number which corresponds to distance $R_1$. Similarly, it is conceivable that another servo loop could give a distance $R_2'$ on a second calibrated potentiometer. Thus, distances $R_1$ and $R_2$ are automatically indicated on calibrated potentiometers. It is obvious that the voltage supplies across potentiometer 16 and resistive element $R_1$ may be reduced to a single floated voltage supply, in which case the shaft end of $R_1$ would have a common ground with the potentiometer at the point designated by zero. Then the free end of the resistive element could be connected to the plus potential of the voltage supply while the point designated by the numeral ten of the potentiometer would be connected to its negative potential. In Fig. 2 the voltage supplies across potentiometer 7 and across resistive element $R_1$ could be similarly reduced to a single voltage supply. It should be added that in this latter arrangement the negative terminal of the voltage supply would be disconnected from the shaft end of resistive element $R_1$.

This computer also may be used to measure great and small circle arc lengths and central angles of spherical triangles. Fig. 4 is one embodiment of a spherical triangle solver in which all three sides of the triangle are arcs of great circles. The side $S_2$ may be the arc of a small circle, but in such a case the arc would be fixed and non-rotatable. However, the arc of a small circle is not shown on the diagram.

Here three spherical configurations are ganged together so that corresponding elements move together. Elements S and S'', arcs of great circles, move in unison making identical angles with some reference. Elements $S_1'$ and $S_1''$ move in unison and elements $S_2$, $S_2'$ and $S_2''$ also move in unison. Rotating shaft X by means of knob K causes S and S'' to rotate about bearings through pairs of bevel gears, 21 and 22 respectively. The bearings are omitted for the sake of simplicity. Rotating shaft $X_1$ by means of knob $K_1$ causes arcs $S_1'$ and $S_1''$ to rotate about bearings through pairs of bevel gears, 28 and 29 respectively. The bearings are omitted again for the sake of simplicity. Rotating shaft $X_2$ by means of knob $K_2$ also causes arcs $S_2$, $S_2'$, and $S_2''$ to rotate about bearings through pairs of bevel gears, 25, 26 and 27 respectively. Again the bearings are omitted.

In sphere I the high resistance element is arc S which contains a wire wound element to enable arc distance to be measured along its length. In sphere II the high resistance element is $S_1'$ and it contains a wire wound element to measure arc distance. In sphere III arc $S_2''$ is similarly constructed to enable measurement of its length. A voltage source is applied across the entire length of arc S and meter $M_1$ reads the voltage from the point at which arc $S_2$ contacts S to the pole Q. This circuit is shown diagrammatically on Fig. 5. Another voltage source is applied across the entire length of arc $S_1'$. Meter $M_2$ measures the voltage from the point at which $S_2'$ contacts $S_1'$ to the pole. This second circuit is also shown on Fig. 5. A similar voltage is applied across the entire length of arc $S_2''$. Meter $M_3$ reads the voltage from the point at which $S''$ contacts $S_2''$ to the point $Q''$. Meter $M_4$ measures the voltage from the point at which $S_1''$ contacts arc $S_2''$ to $Q''$. This third circuit is shown schematically on Fig. 6.

When one side and one angle of an isosceles spherical triangle is known, then the remaining unknown side and angle may be obtained by means of this computer. For example, let $\alpha''$ and $S_1'$ be the known angles and let $S_2''$ and $\gamma''$ be the unknown side and angle respectively. It should be noted that in an isosceles triangle interior angle $\beta''$ is numerically equal to interior angle $\gamma''$, since sides $S_1''$ and $S''$ are equal. The unknown quantities are obtained as follows: knob K may be rotated so as to position arc S at some given angle $\alpha$ with respect to the reference. Then knob $K_1$ is rotated to make arc $S_1'$ be at the desired angle $\alpha''$ with respect to arc $S''$. Finally knob $K_2$ is rotated until meter $M_2$ gives the desired arc length from the top pole of the sphere. The unknown side of the triangle $S_2''$, which is the distance between arcs $S_1''$ and $S''$, is obtained by substracting meter reading $M_3$ from meter reading $M_4$.

Angle $\gamma''$ is to be obtained as follows: the mechanical outputs for angular displacement of $S_1''$ and $S''$ are introduced into a differential gearing system 28 which positions the shaft of a potentiometer 29 a displacement angle of $\alpha''$. A voltage of unity is introduced into this same potentiometer which has a cosine function. Its output is introduced into a signal inverter amplifier 30 and from thence its output is fed into another cosine potentiometer 31 whose shaft is rotated a displacement angle of $\beta$ by being mechanically linked to shaft of arc $S_2'$. Angle $\beta$ corresponds to the amount arc $S_2''$ must be rotated to give known length $S_1'$ on meter $M_2$ shown in Fig. 5. The output of the last potentiometer is equal to $\mp$ cosine $\gamma$. This output enters a voltmeter $M_5$. Its scale is calibrated so as to give the angle $\gamma$ which corresponds to the cosine of that angle. It should be noted that arc $S''$ is insulated from arc $S_1''$, and we can also say that the following angular relationships hold: $\beta = \beta''$, $\gamma' = \gamma''$, and $\alpha' - \alpha = \alpha''$. Also arcs $S''$ and $S_1''$ have identical radii of curvature.

In the case when side $S_2$ is the arc of a small circle, it is fixed and it does not rotate. The device is then used to obtain the length of arc $S_2''$ when angle $\alpha''$ is known or vice versa.

In addition, if the two angles $\alpha''$ and $\beta''$ are given and the radius of the sphere is known, then the unknown sides may be obtained provided arc S is located at the reference position for this example. The arc $S_1'$ is rotated by means of knob $K_1$ so that it makes an angle $\alpha''$ with the reference. The pointer located either on the knob or on the framework, together with the graduated dial, will enable one to know the angular rotation. Meter $M_1$ will now indicate the length of arc S. Meter $M_2$ indicates the length of $S_1'$. Meter $M_4$ gives the length of the base $S_2''$ of the spherical triangle. It should be noted that $\alpha'' = B''$ and that rotating knob $K_2$ sets both of these angles simultaneously into the computing device.

Figs. 7 to 13 inclusive show mechanical drawings of one embodiment of the present invention in which sides of the triangle are straight.

Fig. 7 is a front view of the computer with a portion of the enclosed box removed to show the construction of the computing mechanism itself.

Fig. 8 is an enlarged cross-sectional view taken along line VIII—VIII of Fig. 7 showing the resistance element and clamp construction.

Fig. 9 is a cross-sectional view taken along line IX—IX of Fig. 7 showing a top plan view of the computing mechanism.

Fig. 10 is a cross-sectional view taken along line X—X of Fig. 7 showing a side view of the computing mechanism.

Fig. 11 is an enlarged cross-sectional view taken along line XI—XI of Fig. 7.

Fig. 12 is an enlarged cross-sectional view taken along line XII—XII of Fig. 7.

Fig. 13 is an enlarged fragmentary view of the shaft friction unit consisting of a flanged drum or spool and a flat spring wrapped around its center portion.

Fig. 14 is an alternate enlarged cross-sectional view taken along line XI—XI of Fig. 7.

Referring now to these mechanical drawings on Fig. 7, the computing mechanism is suitably supported on base plate 32. This plate is then supported on another larger plate 33 to which box 34 is attached. On box 34 are mounted meters 35 and 36 to measure distances $R_1$ and $R_2'$ respectively. Also on box 34 is mounted meter 71 to measure distance A. Resistance 69 starts at center of shaft 42 and terminates at end of plate 32. Contact 70 slides along resistance 69 as handle H is moved to adjust position of shaft 45 at the desired distance from shaft 46. The circuit is identical to that shown in Fig 5 where point Q is located at center of shaft 42 and the upper end of resistance is located at the right end of plate 32 in Fig. 9. Openings in box permit visual observation of meter indications. To the underside of base plate 33 are fastened voltage supplies 37 and 38 for application across resistance elements of beams 61 and 59, also shown on Fig. 9. Scale 39 is mounted on box 34 so that its index at 0 coincides with center line of shaft 42. Pointer 63 also is mounted on box 34, shown on Fig. 9. It is desirable that the sides of box 34 be made of transparent material to enable observation of the computing mechanism within the box. Now referring to Fig. 9, on base plate 32 are mounted bearing housings 40 and 41 to support shaft 42, and bearing housings 43 and 44 to support shaft 45. On shaft 42 are mounted hubs 46 and 47, a spring housing 48 containing a coil or wafer spring, and a friction unit 49 containing a flanged drum with a flat spring wrapped around it and fastened to adjacent bearing block 40. Hubs 46 and 47 may be made either of insulating material or of heavily anodized aluminum alloy. The tension spring in housing 48 operates to push against bearing housing 40 and thus cause rod 61 to press against rod 62 and rod 60 to press against rod 59. The drums of friction units 49 and 53 are fixed to shafts 42 and 45 respectively. Both ends of flat spring 74 are fastened by a screw to bearing block 40. The spring is of such a length as to provide the proper tension around the drum so as to enable rods 61 and 60 to remain in whatever position they are set by knob 46'. Friction unit 53 operates in the same way as friction unit 49. This friction unit is shown in detail on Fig. 13. Also on shaft 42 is mounted a knob 46' containing a graduated dial to measure angular displacement.

On shaft 45 are mounted hubs 51 and 52 and a friction unit 53 constructed in the same manner as friction unit 49. Also on shaft 45 is mounted a knob 54 containing a graduated dial to enable measurement of angular displacement.

To bearing blocks 43 and 44 is fastened a plate 55, and the handle H is attached to this plate. The box 34 should be provided with holes on its side to allow the handle supports to pass through.

A flat plate 57, shown on Fig. 9, shaped with a pointer at its lower end, is supported by shaft 45 and held in place between knob 54 and box 34. Slight projections on side of plate bearing against and in contact with box are to reduce friction when shaft assembly is moved. The pointer indicates on scale 39 the horizontal distance of this shaft from shaft 42, as shown on Fig. 7.

Plate 57 is prevented from rotating by means of two guide pins 56, which project into slot 68. Fastened to plate 57 is another pointer 58, shown on Fig. 9, to indicate the angular position of dial on knob 54 from some initial reference position. Thus, pointers 57 and 58 move with the shaft assembly when its position is changed by means of handle H. The box 34 is provided with a horizontal slot 68 to permit shaft 45 to have translational motion as indicated by arrows on Fig. 9.

The hubs on shaft 42 support beams 61 and 60. Beam 61 contains a high resistance element while beam 60 is constructed of good electrical conducting material. Beam 60 is also of hollow construction as shown on Fig. 12. Beam 61 is made from hollow metal tubing to enable the conductor wire to pass through its center. The tube may be round in cross-section as shown on Fig. 11, or it may be rectangular in shape with the resistance element embedded across its length, as shown in Fig. 14. Rod 73, preferably of ferrous metal, supports the resistance element which is held in place with an electrical insulating cement. The purpose of the cavity in the metal is to reduce weight of beam while still retaining its rigidity. The shape of the resistance element may be either elongated or round as shown. The aforementioned cavity also can house the conductor wire.

As presented on Figs. 7 and 9 the two rods 59 and 60 move one across the other so that good continuous contact is maintained. To enable good contact between rods, it is desirable that the rods be made of magnetizable iron or steel and that rod 59 be permanently magnetized so as to attract rod 60 continuously.

The hubs on shaft 45 support beams 59 and 62. In a manner similar to beams 60 and 59, beam 62 is constructed of good electrical conducting material while beam 61 contains a high resistance element, and both beams contain magnetizable material. Both beams 59 and 61 are held rigidly in place by means of clamps such as those shown on Fig. 7 and identified by numbers 64 and 65.

The good conducting rod may be magnetized so that the exterior surface of the hollow tubing will be permanently magnetized as a north pole and the interior surface as a south pole. The rod having the high resistance wire is capable of being attracted by the good conducting rod. Thus, in addition to spring pressure, the rods are assured being in contact with each other at all times by means of magnetic attraction.

Pins 66 and 67 are located at ends of beams, such as those shown on beams 61 and 62 of Fig. 7, to prevent one beam from separating or opening its contact with the other one.

The high resistance wire on beams 59 and 61 may be made of enameled Nichrome metal. For high accuracy and resolution it is desirable to wind as many as one thousand turns of wire per inch of rod length. After winding the wire on the rod and soldering the ends of the wire properly (the upper end soldered to an insulated pin and the other end soldered to the rod so that the last turn of the winding will coincide with the center of the shaft c or d), the surface of the resistive rod which will be in contact with the other rod is rubbed with a fine emery cloth so as to remove the enameled coating across one longitudinal edge of the rod. Another heavier wire may be soldered to the insulated post at the upper end. This wire, which will have insulation on its surface to avoid shorting, may pass down through the hollow interior of the tubing to the hub supporting the rod in position. This end of the wire will then run to the battery or voltage supply. The other end, the ground end of the resistance wire, will have a conductor running to the other terminal of the battery or voltage supply.

One side of the meter is connected to the low resistance rod, which is insulated from its shaft, while the other side of the meter is connected to the ground or to the lower end of $R_1$.

Distance A is measured automatically by means of resistive element 69 mounted on base 32. A leaf spring, ball-pointed arm 70, centrally mounted on bearing block 43, contacts element 69. Voltage is applied across element 69 by voltage source 72. Meter 71 indicates dist. A.

Although only two embodiments of this invention have been illustrated and described (solution of an oblique triangle and a single spherical triangle), it will be understood that many changes, additions, and omissions may be made without departing from the spirit and scope of this invention. For example, the computer could consist of a combination of two or three triangular configurations in tandem (one beside the other such that one side of a triangle is common to two triangles) as well as consisting of triangles ganged one behind the other.

What is claimed is:

1. A system for determining sides and angles of a triangle, which comprises an elongated base member, a high resistance tubular element pivotally connected to one end of said base member with voltage applied across its length, a low resistance tubular element pivotally connected to the other end of said base member, one of said tubular elements being of magnetizable material having the exterior surface magnetized as a north pole and the interior surface magnetized as a south pole, dials for moving said elements into contracting relation for indicating angles and meters responsive to the points of contact between said elements for indicating sides of said triangle.

2. A system for physically presenting a configuration of a geometric problem, which comprises a base member, a pair of members movable about pivots relative to said base member, one of said pair of members consisting of a high resistance element with volage applied across its length, the other of said pair of members consisting of a low resistance tubular element, means for moving said pair of members relatively while in contact with each other and means for indicating the contacting relation of said pair of movable members and means for changing the dimensions between said pivots of said base member, said tubular low resistance element having the exterior surface magnetized as a north pole and the interior surface magnetized as a south pole.

3. A system for determining the sides and angles of a triangle which comprises an elongated base member, a good conductive element movable about at pivot at one end of said base member, a high resistance conductive element with voltage applied across its length movable about a pivot at the other end of said base member, a receiving synchro motor for moving one of said elements, a servo motor for relatively moving the other of said elements while in angular contacting relation, means whereby a rotation of the shaft of said second mentioned motor in response to a remote signal will cause the contacting relation of said elements to vary, and means for changing the effective length of said base member between said pivots.

4. A system for determining the sides and angles of a triangle which comprises an elongated base member, a high resistance element with voltage applied across its length and movable about a pivot at one end of said base member, a low resistance element movable about a pivot at the other end of said base member, a receiving synchro motor attached to the shaft of the high resistance element, a receiving servo motor for relatively moving said elements while in angular contacting relation and means whereby a variation of the signal input to said synchro motor will actuate said servo motor to vary the contacting relation of said elements.

5. A system for determining the sides and angles of a triangle which comprises an elongated base member, a high resistance element with voltage applied across its length and movable about a pivot at one end of said base member, a low resistance element movable about a pivot at the other end of said base member, a receiving servo motor connected to said low resistance element, a synchro motor attached to the shaft of the high resistance element for relatively moving said elements while in angular contacting relation and means whereby a rotation of the shaft of said second mentioned motor will actuate said receiving servo motor to vary the contacting relation of said elements and means for changing the dimension between pivots of said base member.

6. A system for physically presenting a configuration of a geometric problem which comprises an elongated base member containing a high resistance element mounted in a fixed horizontal position across its length and electrically insulated therefrom, a pair of conductor elements, one a high resistance with voltage applied across its length and pivotally connected to one end and the other a low resistance element pivotally connected to the other end of said base member, disposed in contacting angular relation each movable in an arc relative to said base member and the low resistance element also movable with its pivotal connection translationally along said base member while an arm extended from said pivotal connection makes electrical contact with said fixed high resistance element, means for moving said pair of elements into contacting angular relation so that the high resistance element is in contact with the low resistance element, meters responsive to the resistance of each high resistance element for indicating the length of sides of a triangle, including the variable distance between pivotal connections of said base member, graduated dials responsive to the pivotal movement of said elements for indicating angles of the triangle and means for varying the effective length of said base member between pivotal connections of said elements with said base member.

7. A system for physically presenting a configuration of a geometric problem, which comprises a base member, two pairs of conductor elements each pair movable in an arc relative to said base member, and each pair including one high resistance element with voltage applied across its length and one low resistance element, one pair of said conductor elements being pivotally connected to one end of said base member and making identical angles therewith and the other pair of said conductor elements being pivotally connected to the other end of said base member and making identical angles therewith, means for moving said pairs of conductor elements into contacting angular relation so that one high resistance element is in contact with one low resistance element, meters responsive to the resistance of each high resistance element between the point of contact between the elements and one end thereof for indicating the length of sides of a triangle, graduated dials responsive to the pivotal movement of said elements for indicating angles of the triangle and means for varying the effective length of said base member between the pivotal connections of said elements with said base member.

8. A system for determining sides and angles of a triangle which comprises a base member, a pair of straight conductor elements, one a good conductor and the other a poor linear conductor, with voltage applied across its length, disposed in contacting angular relation and one of said conductors being movable relative to said base member, means for moving said pair of elements relatively in contact with each other to vary said angular relation and a null voltage detector, means including a positional servomechanism having a graduated potentiometer and contact arm, to compare electrically the position of contact of the good conductor on the poor conductor with the position of contact of the graduated potentiometer, the position of contact of the potentiometer arm relative to one end of the potentiometer indicating the position of the good conductor relative to one end of the poor conductor.

References Cited in the file of this patent

UNITED STATES PATENTS

| | | |
|---|---|---|
| 288,321 | Farley | Nov. 13, 1883 |
| 559,689 | Dunn | May 5, 1896 |
| 997,826 | Jones | July 11, 1911 |
| 1,117,805 | De L'Eau | Nov. 17, 1914 |
| 1,154,252 | Kennedy | Sept. 21, 1915 |
| 1,433,070 | Conners | Oct. 24, 1922 |
| 1,551,393 | Hewlett et al. | Aug. 25, 1925 |
| 2,221,872 | King et al. | Nov. 19, 1940 |
| 2,422,025 | Luck | June 10, 1947 |
| 2,630,968 | Muskat | Mar. 10, 1953 |